United States Patent
Rudelic

(10) Patent No.: US 9,336,410 B2
(45) Date of Patent: May 10, 2016

(54) NONVOLATILE MEMORY INTERNAL SIGNATURE GENERATION

(75) Inventor: John C Rudelic, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 835 days.

(21) Appl. No.: 12/638,953

(22) Filed: Dec. 15, 2009

(65) Prior Publication Data

US 2011/0145600 A1  Jun. 16, 2011

(51) Int. Cl.
*G06F 21/64* (2013.01)
*G06F 21/56* (2013.01)
*G06F 21/79* (2013.01)

(52) U.S. Cl.
CPC .............. *G06F 21/64* (2013.01); *G06F 21/565* (2013.01); *G06F 21/79* (2013.01)

(58) Field of Classification Search
CPC ....... G06F 21/51; G06F 21/565; G06F 21/64; G06F 21/79
See application file for complete search history.

(56) References Cited

U.S. PATENT DOCUMENTS

| | | | |
|---|---|---|---|
| 5,937,063 A | 8/1999 | Davis | |
| 6,138,236 A | 10/2000 | Mirov et al. | |
| 6,185,678 B1 | 2/2001 | Arbaugh et al. | |
| 6,409,089 B1 | 6/2002 | Eskicioglu | |
| 6,928,548 B1* | 8/2005 | Hale et al. | 713/187 |
| 7,380,275 B2 | 5/2008 | Srinivasan et al. | |
| 7,873,837 B1 | 1/2011 | Lee et al. | |
| 8,181,034 B2* | 5/2012 | Elbaum et al. | 713/187 |
| 8,332,652 B2 | 12/2012 | Boivie et al. | |
| 8,364,975 B2 | 1/2013 | Kumar et al. | |
| 8,560,823 B1 | 10/2013 | Aytek et al. | |
| 9,058,491 B1 | 6/2015 | Ahlquist | |
| 2002/0087877 A1 | 7/2002 | Grawrock | |
| 2003/0018892 A1 | 1/2003 | Tello | |
| 2003/0126454 A1* | 7/2003 | Glew et al. | 713/193 |
| 2004/0025036 A1 | 2/2004 | Balard et al. | |
| 2004/0088559 A1 | 5/2004 | Foster et al. | |
| 2005/0066169 A1* | 3/2005 | Kiehtreiber et al. | 713/170 |
| 2005/0097052 A1* | 5/2005 | Systa et al. | 705/51 |
| 2005/0114338 A1* | 5/2005 | Borthakur et al. | 707/9 |
| 2005/0132186 A1 | 6/2005 | Khan et al. | |
| 2005/0138409 A1 | 6/2005 | Sheriff et al. | |
| 2005/0289343 A1 | 12/2005 | Tahan | |
| 2006/0026417 A1 | 2/2006 | Furusawa et al. | |
| 2006/0048221 A1* | 3/2006 | Morais et al. | 726/22 |
| 2006/0090084 A1 | 4/2006 | Buer | |
| 2007/0061897 A1 | 3/2007 | Holtzman et al. | |
| 2007/0192610 A1* | 8/2007 | Chun | G06F 21/64 713/176 |
| 2007/0300068 A1* | 12/2007 | Rudelic | G06F 21/572 713/176 |
| 2008/0101109 A1* | 5/2008 | Haring-Bolivar et al. | 365/163 |

(Continued)

OTHER PUBLICATIONS

I. Curry, "An Introduction to Cryptography and Digital Signatures," Entrust, Mar. 2001, Retrieved May 18, 2012, Online: https://www.netrust.net/docs/whitepapers/cryptointro.pdf.*

(Continued)

*Primary Examiner* — Robert Leung
(74) *Attorney, Agent, or Firm* — Dorsey & Whitney LLP

(57) ABSTRACT

A nonvolatile memory device generates a signature using a private key and contents within the memory device. The signature is stored in a secure area within the nonvolatile memory device. A processor having the same private key also generates a signature that is stored in the clear. The processor validates the contents of the nonvolatile memory by comparing the signatures.

17 Claims, 5 Drawing Sheets

(56) References Cited

U.S. PATENT DOCUMENTS

| | | | |
|---|---|---|---|
| 2008/0104416 A1* | 5/2008 | Challener et al. | 713/189 |
| 2008/0155275 A1 | 6/2008 | Natarajan et al. | |
| 2008/0165952 A1 | 7/2008 | Smith et al. | |
| 2008/0244269 A1 | 10/2008 | Ishibashi et al. | |
| 2009/0094597 A1 | 4/2009 | Moskalik et al. | |
| 2009/0113215 A1* | 4/2009 | Aharonov | 713/189 |
| 2009/0285390 A1 | 11/2009 | Scherer et al. | |
| 2009/0319782 A1 | 12/2009 | Lee | |
| 2010/0082961 A1 | 4/2010 | Gurumoorthy et al. | |
| 2011/0131447 A1* | 6/2011 | Prakash et al. | 714/19 |
| 2012/0084438 A1 | 4/2012 | Raleigh et al. | |
| 2012/0143967 A1 | 6/2012 | Leonard | |
| 2015/0227474 A1 | 8/2015 | Ahlquist | |

OTHER PUBLICATIONS

G. Sivathanu, "Ensuring Data Integrity in Storage: Techniques and Applications," StorageSS'05, Nov. 11, 2005, ACM, pp. 26-36.*

Arbaugh, William A. et al., "A Secure and Reliable Bootstrap Architecture", 1997 IEEE Security and Privacy Conference, Dec. 2, 1996, 65-71.

Dietrich, , "Secure Boot Revisited", 9th International Conference for Young Computer Scientists, Nov. 18-21, 2008, 2360-2365.

* cited by examiner

NONVOLATILE MEMORY INTERNAL SIGNATURE GENERATION

FIELD

The present invention relates generally to data storage in memory devices, and more specifically to data storage in nonvolatile memory.

BACKGROUND

Many electronic devices include nonvolatile memory. The nonvolatile memory may be used to store executable code, or for file system storage similar to a disk drive, or for any other use. For example, mobile phones typically include nonvolatile memory to store both executable code and file systems since these devices typically do not have hard disks. Also for example, computers typically include nonvolatile memory to store at least a small amount of executable code that is accessed during the boot process. This code is commonly referred to as the Basic Input/Output System, or "BIOS."

Security concerns abound. If the contents of nonvolatile memory are maliciously modified, a device may be compromised, or indeed, completely taken over. For example, if the BIOS in a computer is maliciously modified and the computer executes the modified code during the boot process, the computer is effectively hijacked. Also for example, if executable code in a mobile phone is maliciously modified, the phone may also be hijacked.

BRIEF DESCRIPTION OF THE DRAWINGS

Embodiments of the invention are illustrated by way of example and not limitation in the figures of the accompanying drawings, in which.

DESCRIPTION OF EMBODIMENTS

Figure 1:
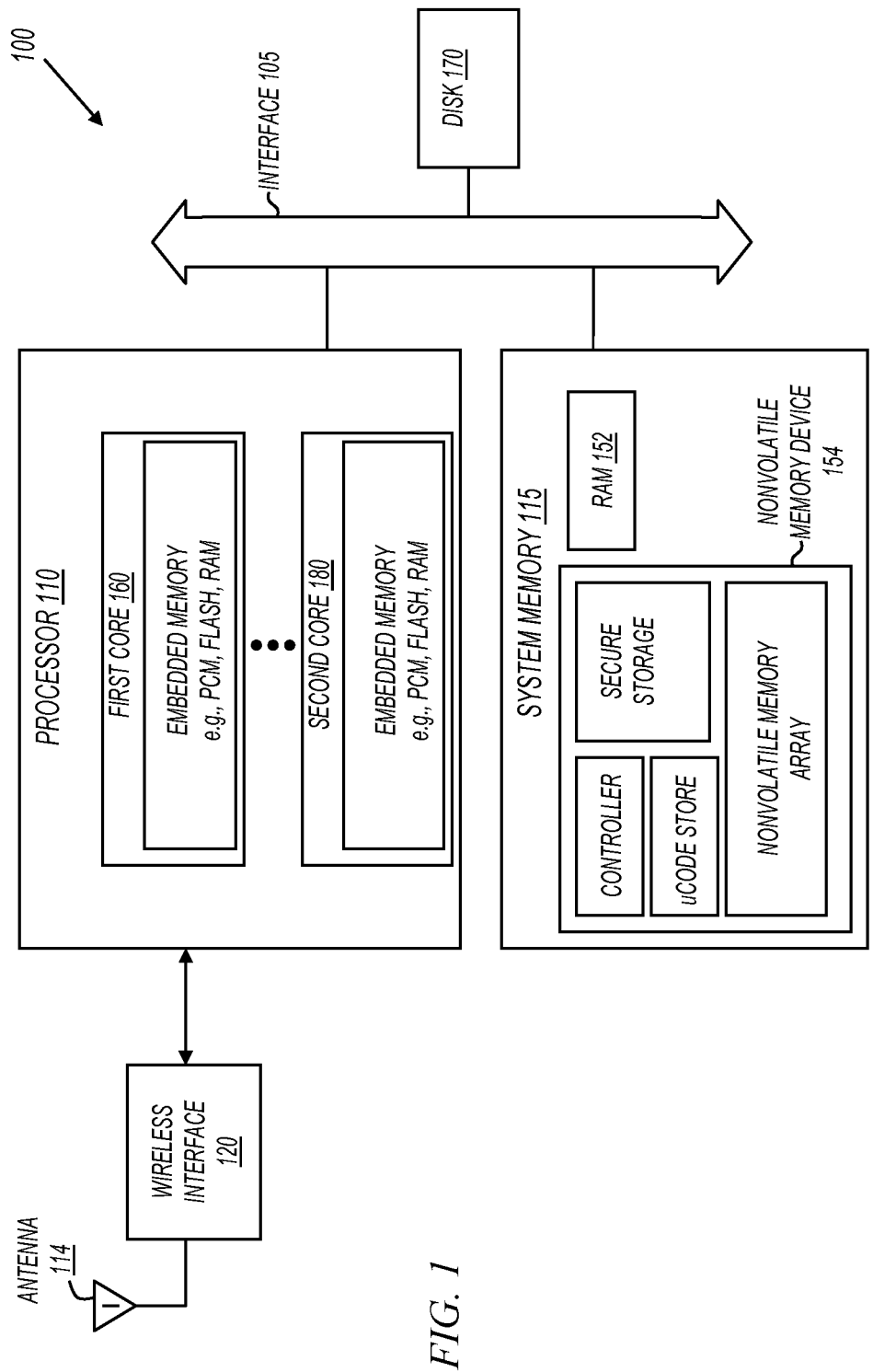
FIG. 1 shows an electronic system in accordance with various embodiments of the invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a system 100 in accordance with various embodiments of the present invention. System 100 may be any type of system with memory. For example, system 100 may be a computer or a mobile phone with volatile and nonvolatile memory. Also for example, system 100 may be a global positioning system (GPS) receiver or a portable media player with volatile and nonvolatile memory. System 100 may be any type of device without departing from the scope of the present invention.

In some embodiments, system 100 has a wireless interface 120. Wireless interface 120 is coupled to antenna 140 to allow system 100 to communicate with other over-the-air communication devices. As such, system 100 may operate as a cellular device or a device that operates in wireless networks such as, for example, Wireless Local Area Networks (WLANs), WiMax and Mobile WiMax based systems, Wideband Code Division Multiple Access (WCDMA), and Global System for Mobile Communications (GSM) networks, any of which may or may not operate in accordance with one or more standards. The various embodiments of the invention are not limited to operate in the above network types; this is simply a list of examples. It should be understood that the scope of the present invention is not limited by the types of, the number of, or the frequency of the communication protocols that may be used by system 100. Embodiments are not, however, limited to wireless communication embodiments. Other non-wireless applications can use the various embodiments of the invention.

System 100 includes processor 110 coupled to interface 105. Interface 105 provides communication between processor 110 and the various other devices coupled to interface 105. For example, processor 110 may communicate with memory devices in system memory 115, as well as disk 170. Interface 105 can include serial and/or parallel buses to share information along with control signal lines to be used to provide handshaking between processor 110 and the various other devices coupled to interface 105.

System 100 may or may not include disk 170. For example, some mobile phone embodiments do not include disk 170. Also for example, some computer embodiments include disk 170.

System memory 115 may include one or more different types of memory and may include both volatile (e.g., random access memory (RAM) 152) and nonvolatile memory 154. Nonvolatile memory 154 may be any type of nonvolatile memory (e.g., phase change memory (PCM), NOR FLASH memory, NAND single level cell (SLC) memory, or NAND multi-level cell (MLC) memory). These memory types are listed as examples, and this list is not meant to be exclusive. For example, some embodiments may include Ovonic Unified Memory (OUM), Chalcogenide Random Access Memory (C-RAM), Magnetic Random Access Memory (MRAM), Ferroelectric Random Access Memory (FRAM), Static Random Access Memory (SRAM), Dynamic Random Access Memory (DRAM), or any other type of storage device.

Processor 110 includes at least one core 160, 180, and each core may include memory. For example, first core 160 may include volatile or nonvolatile memory such as PCM, FLASH, or RAM. Each core may include any combination of different types of memory without departing from the scope of the present invention. Processor 110 may execute instructions from any suitable memory within system 100. For example, any of the memory devices within system memory 115 may be considered a computer-readable medium that has instructions stored that when accessed cause processor 110 to perform embodiments of the invention.

One or more nonvolatile memory device present in system 100 may include mechanisms to internally generate signatures. For example, nonvolatile memory 154 is shown including a controller, a microcode (ucode) store, a secure storage area, and a nonvolatile memory array. In some embodiments, the controller generates a signature from contents of the nonvolatile memory array and stores the signature in the secure storage area. The controller then provides the signature on interface 105 when requested.

In some embodiments, the controller implements a secure hash algorithm to generate a unique signature from nonvolatile memory contents and a private key stored in the secure storage area. In some embodiments, the controller includes hardware that implements the secure hash algorithm. In other embodiments, the controller executes microcode that performs a secure hash algorithm. In other embodiments, the controller implements an algorithm to generate a unique signature from nonvolatile memory contents using a checksum or cyclic redundancy check (CRC).

Processor 110 may also generate a signature from the same private key and memory contents. For example, processor 110 may read the nonvolatile memory contents and generate a signature using the same secure hash algorithm and private key as used in the nonvolatile memory. The private key used to generate signatures is known to both the processor and the nonvolatile memory.

Signatures generated by processor 110 are stored in the clear. For example, the signature generated by processor 110 may be stored in the nonvolatile memory array within nonvolatile memory device 154.

Processor 110 may verify the contents of nonvolatile memory by reading the signature stored in the clear (the signature previously generated by the processor), requesting the signature stored in the secure storage area of the nonvolatile memory device (the signature previously generated within the nonvolatile memory device), and comparing the two. If the signatures match, then the processor can be sure that the nonvolatile memory contents are valid.

In some embodiments, the processor performs this validation before executing code from within the nonvolatile memory. For example, system 100 may be a computer and the BIOS may be held in nonvolatile memory device 154. Prior to executing code from the BIOS, the processor reads the signature in the clear, requests the secure signature from the memory device, and makes a comparison. In some embodiments, the BIOS may include boot code for a computer, and in other embodiments, the BIOS may include applications. For example, a music player application or a video player application may be present in the nonvolatile memory device 154. In other embodiments, system 100 is a mobile phone and the nonvolatile memory includes all of the executable code for the phone. Prior to executing code from the nonvolatile memory, the processor can validate the contents of the memory by comparing the signature maintained in the clear with the signature maintained in the secure storage within the nonvolatile memory device.

Although the internal signature generation embodiments are described above with reference to nonvolatile memory device 154, the invention is not so limited. For example, embedded memory within either of cores 160 or 180 may include the internal signature generation.

Figure 2:
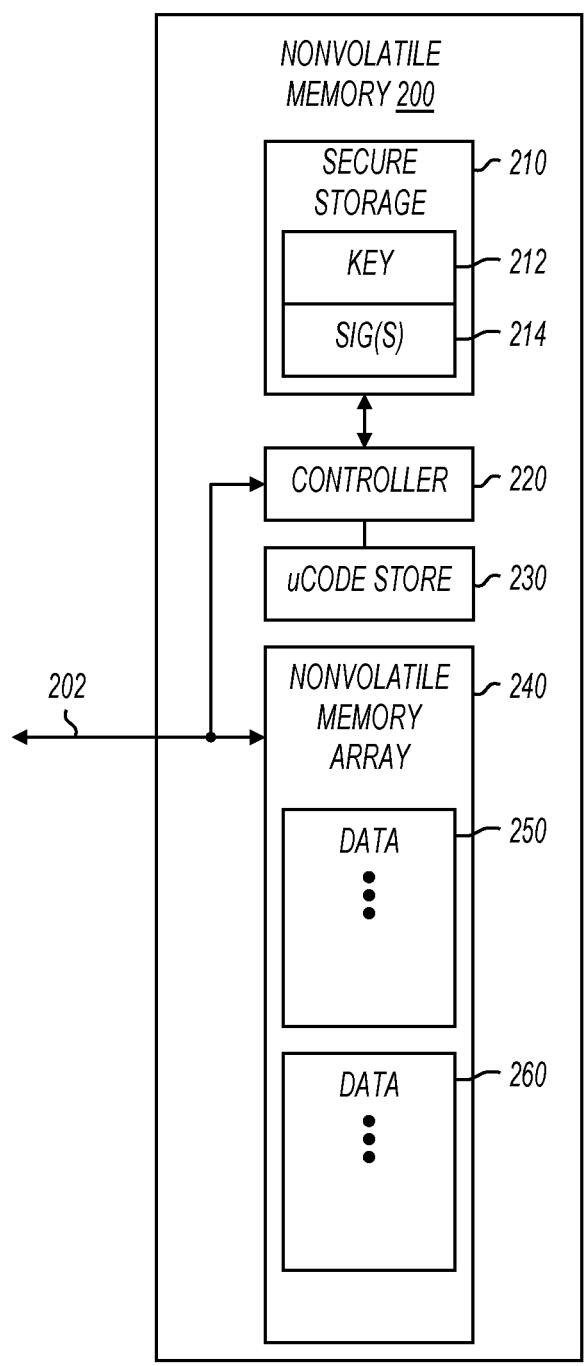
FIGS. 2 and 3 show nonvolatile memory devices in accordance with various embodiments of the invention.

FIG. 2 shows a nonvolatile memory device in accordance with various embodiments of the present invention. Nonvolatile memory device 200 may be any type of nonvolatile memory, including PCM or FLASH. Nonvolatile memory device 200 may be located anywhere in a system. For example, nonvolatile memory device 200 may be tightly coupled memory within a core such as core 160 or core 180, or may be a separate device such as nonvolatile memory 154.

Nonvolatile memory device 200 includes nonvolatile memory array 240, controller 220 with associated microcode store 230, and secure storage area 210. Nonvolatile memory array 240 and controller 220 are coupled to interface 202 which allows external devices to access the contents within nonvolatile memory 240, and to make requests of controller 220. For example, interface 202 may be coupled to interface 105 (FIG. 1), thereby allowing processor 110 to access contents within nonvolatile memory array 240 and make requests of controller 220.

Secure storage area 210 stores key 212 and signature(s). Key 212 is private and is only known to nonvolatile memory device 200, although an external device such as a processor coupled to interface 202 shares the same private key.

Secure storage 210 is not directly accessible by an external device. Any attempt to access the secure storage area must go through controller 220, and controller 220 may grant or deny access. For example, if an external device requests read or write access to private key 212, controller 220 will generally deny it. Also for example, if an external device requests read access to signature(s) 214, controller will generally grant it.

Nonvolatile memory array 240 is shown having two data sets 250 and 260. Any number of data sets may be included without departing from the scope of the present invention. In some embodiments, controller 220 creates a unique signature for at least one of the data sets 250, 260. For example, controller 220 may generate a signature using a secure hash algorithm from private key 212 and the contents in data set 250. Also for example, controller 220 may generate a different signature using the same secure hash algorithm from private key 212 and the contents in data set 260. The signatures generated by controller 220 are stored in secure storage area 210 at 214.

In some embodiments, controller 220 includes dedicated hardware that performs the secure hash algorithm. In other embodiments, controller 220 executes code from microcode store 230 and performs a secure hash algorithm in response thereto.

In some embodiments, nonvolatile memory device 200 generates or regenerates signature(s) 214 when the contents of nonvolatile memory array 240 changes. For example, in some embodiments, nonvolatile memory device 200 may be in a mobile phone, and one or more of data sets 250, 260 may be software to be executed by the mobile phone. Nonvolatile memory contents may be updated using over-the-air (OTA) signed update packages that ensure only authorized entities have the ability to modify the nonvolatile memory contents. When the nonvolatile memory contents are updated by an authorized entity, signature(s) 214 are regenerated.

In some embodiments, less than all data sets in nonvolatile memory array 240 are signed. For example, data set 250 may include executable code that is signed as described herein, while data set 260 may include other storage of data that is not signed. Any combination of signed and non-signed data sets may coexist within nonvolatile memory array 240.

Although signature(s) 214 are described above as having been created using a private key, this is not a limitation of the present invention. For example, in some embodiments, signature(s) 214 may be created using a checksum, a CRC, or the like. Further, in some embodiments, a public/private key pair is employed to manage signature(s) 214.

Figure 3:
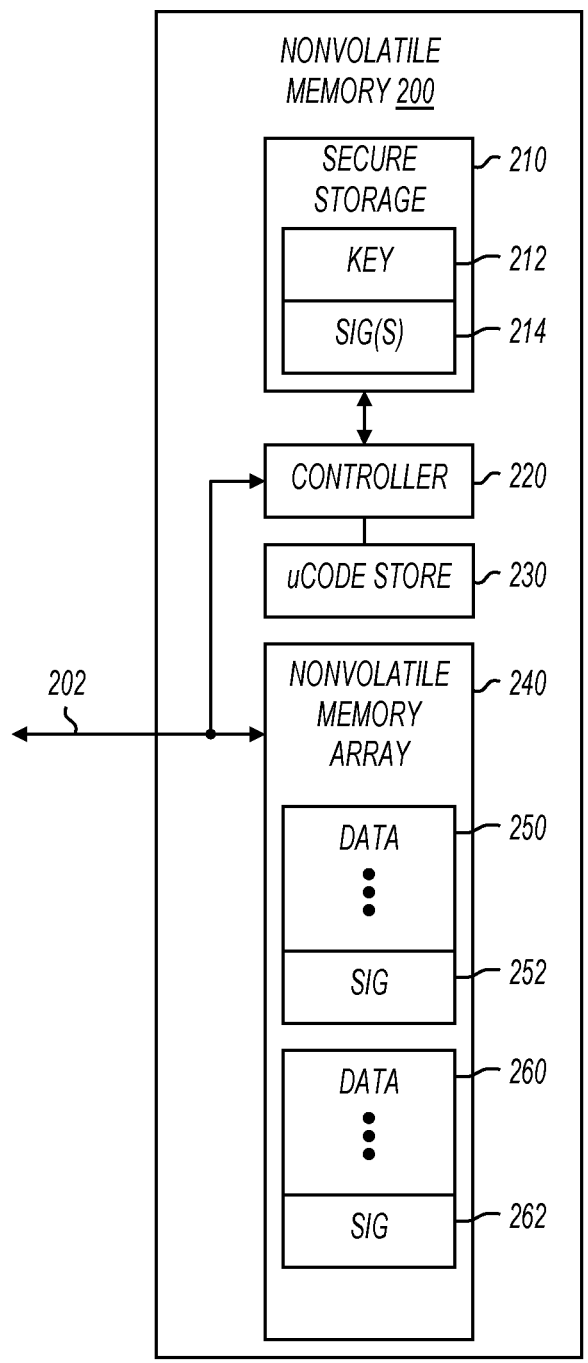

FIG. 3 shows a nonvolatile memory device in accordance with various embodiments of the present invention. Nonvolatile memory device 200 is the same device shown in, and described above with reference to, FIG. 2. The only difference is that in FIG. 3, signatures 252 and 262 are stored in the clear. In contrast to signature(s) 214, signatures 252 and 262 are not internally generated by the nonvolatile memory device. Rather, signatures 252 and 262 are generated by a device external to the nonvolatile memory device and then stored in the clear within the nonvolatile memory array. Although signatures 252 and 262 are shown stored in the same device that internally generated signatures, this is not a limitation of the present invention. For example, signatures 252 and 262 may be stored in a different memory device.

In some embodiments, a processor such as processor 110 (FIG. 1) generates signatures 252 and 262 from a private key within the processor and the data contents within the nonvolatile memory array. If the private key within the processor matches the private key within the secure storage area of the nonvolatile memory device, then the signatures stored in the clear will match the signatures stored in the secure storage area of the nonvolatile memory device.

When the processor wishes to validate the memory contents, the processor reads the signature stored in the clear (e.g., signature 252), requests the value of the signature stored in the secure storage area (e.g., signature 214), and compares them. If the signatures match, then the memory contents are valid. If they do not match, then the memory contents are invalid.

Storing a signature in the clear saves time when validating the memory contents. For example, in some embodiments, nonvolatile memory 200 may store BIOS code in a computer. The BIOS code may include one or more applications (e.g., media player) that can be run without the computer booting completely. Prior to executing the application, the computer validates the application in the BIOS. If both signatures (internally generated signature and in-the-clear signature) have been previously generated and stored, then the computer can quickly validate the contents by simply comparing the signatures.

Figure 4:
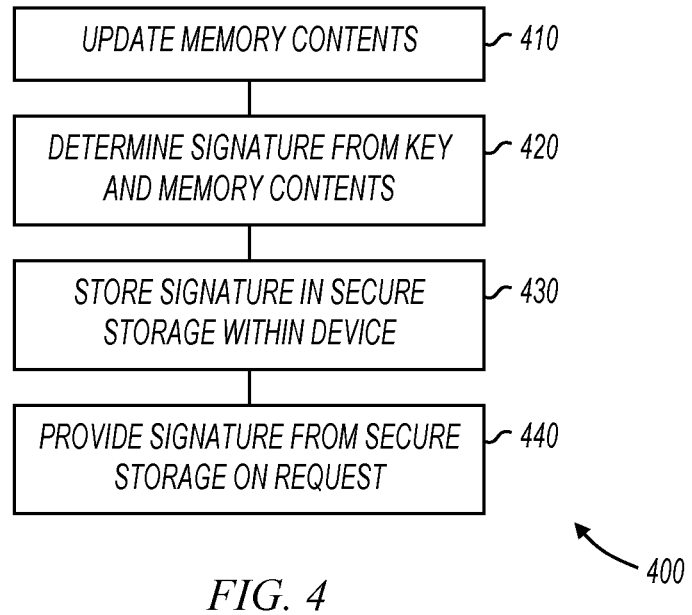
FIGS. 4-6 show flow diagrams in accordance with various embodiments of the present invention.

Referring now to FIG. 4, a flowchart of various method embodiments is shown. The actions shown in method 400 may be performed in the order shown or in a different order. Further, method 400 may include less than all actions shown. Method 400 may be performed by a nonvolatile memory device, a controller within a nonvolatile memory device, or an electronic system.

At 410, memory contents are updated. In some embodiments, this corresponds to an initial programming of the nonvolatile memory array 240 (FIG. 2) within nonvolatile memory device 240. In other embodiments, the actions of 410 correspond to controller 220 accepting a request to update one or more of data sets 250, 260. The request may be a signed update package that includes a difference file.

At 420, a signature is determined from the private key and the memory contents, and at 430, the signature is stored in secure storage within the device. For example, if data set 250 is modified, then the corresponding signature at 214 will be regenerated using private key 212 and the updated memory contents at 250.

At 440, the signature is provided to an external device upon request. For example, if an external device such as a processor coupled to interface 202 requests the value of a signature at 214, then controller 220 will provide it. Providing the signature upon request does not compromise the private key because the secure hash algorithm used to generate the signature is a one-way function. In other words, the private key cannot be determined from the signature.

Figure 5:
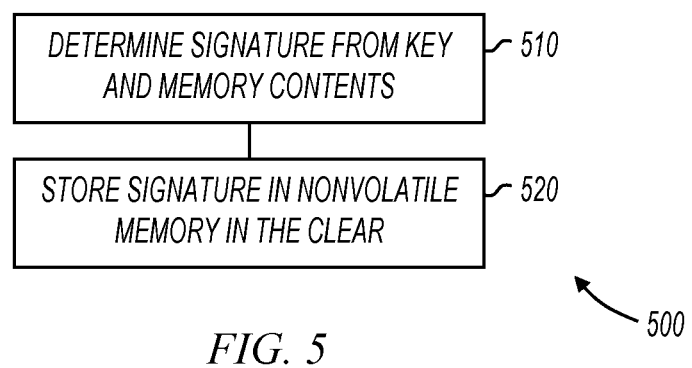

FIG. 5 shows a flow diagram in accordance with various embodiments of the invention. In some embodiments, method 500, or portions thereof, is performed by a processor coupled to a nonvolatile memory device. For example, method 500 may be performed by processor 110 (FIG. 1). The various actions in method 500 may be performed in the order presented, or may be performed in a different order. Further, in some embodiments, some actions listed in FIG. 5 are omitted from method 500.

Method 500 is shown beginning at 510 when a signature is determined from a private key and memory contents. In the context of FIG. 1, this corresponds to processor 110 reading contents of a nonvolatile memory in either one of cores 160, 180, or nonvolatile memory device 154, and generating a signature from the memory contents and a private key held within the processor. In the context of FIG. 3, the signature of 510 corresponds to one or both of signatures 252 or 262.

At 520, the signature is stored in nonvolatile memory in the clear. This corresponds to storing one or both of signatures 252 or 262 in nonvolatile memory array 240 (FIG. 3). In some embodiments, the signature is stored in a nonvolatile memory other than the memory device that includes the data. In other embodiments, the signature is stored in volatile memory. The processor has access to this signature at all times.

In some embodiments, method 500 may be performed when the memory contents are modified or updated. For example, referring now back to FIG. 3, if data 250 is modified, a processor external to nonvolatile memory device 200 may read the data 250 and regenerate signature 252. In other embodiments, method 500 may be performed at other times. For example, signatures may be periodically regenerated at idle times, or may be regenerated when a security level of the processor is changed.

Figure 6:
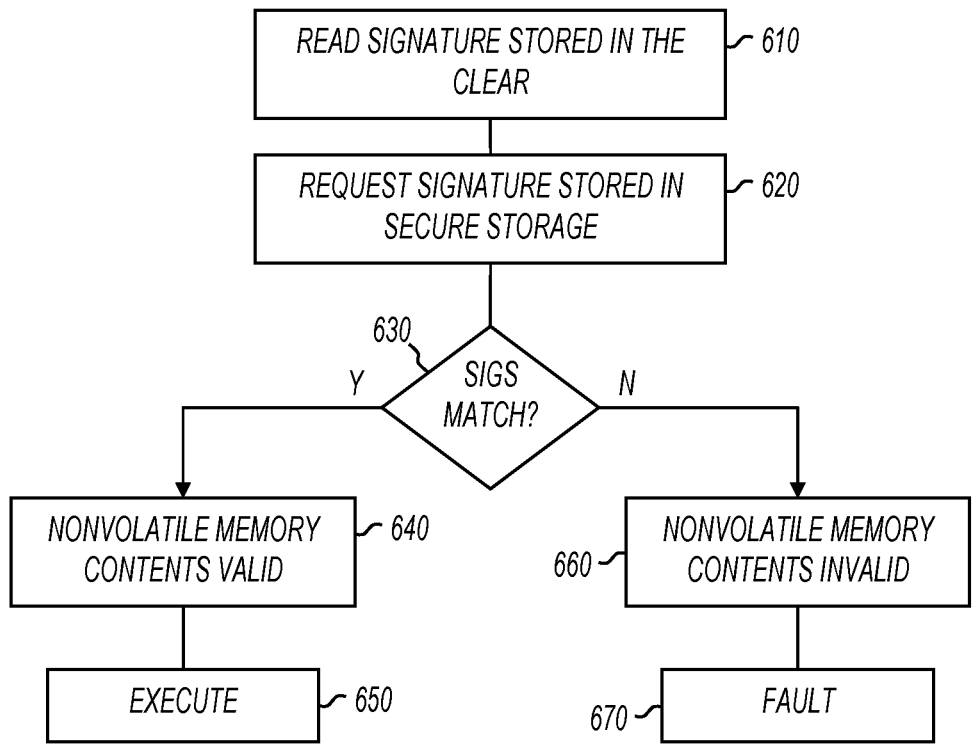

FIG. 6 shows a flow diagram in accordance with various embodiments of the invention. In some embodiments, method 600, or portions thereof, is performed by a processor coupled to a nonvolatile memory device. For example, method 600 may be performed by processor 110 (FIG. 1). The various actions in method 600 may be performed in the order presented, or may be performed in a different order. Further, in some embodiments, some actions listed in FIG. 6 are omitted from method 600.

Method 600 is shown beginning at 610 when a signature stored in the clear is read. In some embodiments, this signature was previously generated by the same device performing method 600. For example, referring now back to FIGS. 1 and 3, processor 110 previously generated and stored signature 252 (see FIG. 5). In the context of this example, processor 110 reads signature 252.

At 620, a request is made for a signature in a secure storage area. This corresponds to an external device requesting an internally generated and stored signature. For example, referring now back to FIGS. 1 and 3, processor 110 requests controller 220 to provide signature 214 from secure storage area 210.

At 630, the two signatures are compared. If they match, the nonvolatile memory contents are valid (640). In some embodiments, after determining the validity of the memory contents, the processor executes (650) code from the validated memory. In other embodiments, the validated portion of the nonvolatile memory may store something other than executable code. In these embodiments, block 650 may be omitted.

If the signatures do not match at 630, then the nonvolatile memory contents do not match (660). There may be many different possible reasons why the signatures do not match. One possibility is that the nonvolatile memory contents have been maliciously modified. The signature stored in the secure storage area of the nonvolatile memory device is the latest valid internally generated signature. If the nonvolatile memory contents have been modified since the internally generated signature was last generated, then the signatures will not match. In these embodiments, a processor fault may be raised at 670, and appropriate actions (e.g., reboot, restore, etc.) may be taken in a fault handler.

Unless specifically stated otherwise, as apparent from the preceding discussions, it is appreciated that throughout the specification discussions utilizing terms such as "monitoring," "storing," "detecting," "using," "identifying," "marking," "receiving," "loading," "reconfiguring," "formatting," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), FLASH memories, PCM memories, magnetic or optical cards, or any other type of media suitable for storing electronic instructions, and capable of being coupled to a system bus for a computing device.

Various general purpose systems may be used with programs in accordance with the teachings herein, or it may prove convenient to construct a more specialized apparatus to perform the desired method. The desired structure for a variety of these systems appears in the description above. In addition, embodiments of the invention are not described with reference to any particular programming language. A variety of programming languages may be used to implement the teachings of the invention as described herein. In addition, it should be understood that operations, capabilities, and features described herein may be implemented with any combination of hardware (discrete or integrated circuits) and software.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    receiving an external signature for data stored within a nonvolatile memory device from an external device;
    storing the external signature for the data in the clear within the nonvolatile memory device;
    generating, by a controller within the nonvolatile memory device storing the data, a signature from the data stored within the nonvolatile memory device, wherein the signature is generated based on the data and a private key stored within a secure storage area of the nonvolatile memory device;
    storing the signature in a secure storage area within the nonvolatile memory device; and
    providing the signature from the secure area and the external signature to the external device when requested, wherein the signature in the secure storage area is compared with the external signature to validate the data.

2. The method of claim 1 further comprising:
    accepting at the nonvolatile memory device changes to the data stored within the nonvolatile memory device; and
    updating the signature to reflect the changes.

3. The method of claim 1 wherein generating a signature comprises generating a signature using a secure hash algorithm.

4. The method of claim 1 wherein generating a signature comprises generating a signature using a private key.

5. The method of claim 1 wherein generating a signature within a nonvolatile memory device comprises generating a signature within a phase change memory (PCM) device.

6. The method of claim 1 wherein generating a signature within a nonvolatile memory device comprises generating a signature within a FLASH memory device.

7. A nonvolatile memory device having instructions stored thereon that when executed by a controller within the nonvolatile memory device cause the controller to:
    receive and store in the clear an externally generated signature for data stored within the nonvolatile memory device, wherein the externally generated signature is received from a device external to the nonvolatile memory device;
    generate a signature from a private key and the data stored within the nonvolatile memory device, wherein the private key is stored in a secure storage area within the nonvolatile memory device;
    store the signature in the secure storage area within the nonvolatile memory device; and
    provide the signature and the externally generated signature from the secure storage area to the device external to the nonvolatile memory device when requested, wherein the signature provided from the secure storage area is compared to the externally generated signature to validate the data.

8. The nonvolatile memory device of claim 7 wherein the instructions when executed, further cause the controller to:
    accept at the nonvolatile memory device changes to the data stored within the nonvolatile memory device; and
    update the signature to reflect the changes.

9. The nonvolatile memory device of claim 7 wherein generating a signature comprises generating a signature using a secure hash algorithm.

10. The nonvolatile memory device of claim 7 wherein the nonvolatile memory device comprises a phase change memory (PCM) device.

11. The nonvolatile memory device of claim 7 wherein the nonvolatile memory device comprises a FLASH memory device.

12. A nonvolatile memory device comprising:
    a nonvolatile memory array accessible by a device external to the nonvolatile memory device and configured to store in the clear an externally generated signature for data stored in the nonvolatile memory array, wherein the externally generated signature is received from the device external to the nonvolatile memory device;
    a nonvolatile secure storage area not accessible by devices external to the nonvolatile memory device; and
    a controller configured to secure the secure storage area and to generate a signature from a private key and contents of the nonvolatile memory array, and to store the signature in the secure storage area, the controller further configured to provide the signature and the externally generated signature to the external device responsive to a request, wherein the signature in the secure storage area is compared to the externally generated signature to validate the contents of the nonvolatile memory array.

13. The nonvolatile memory device of claim 12 further comprising:
   a microcode store accessible by the controller, the microcode store including instructions to cause the controller to update the signature when changes are made to the contents of the nonvolatile memory array.

14. The nonvolatile memory device of claim 12 wherein the controller implements a secure hash algorithm to generate the signature.

15. The nonvolatile memory device of claim 12 wherein the key is a private key stored in the secure storage area.

16. The nonvolatile memory device of claim 12 wherein the nonvolatile memory array comprises phase change memory (PCM).

17. The nonvolatile memory device of claim 12 wherein the nonvolatile memory array comprises FLASH memory.

\* \* \* \* \*